Figure 8:
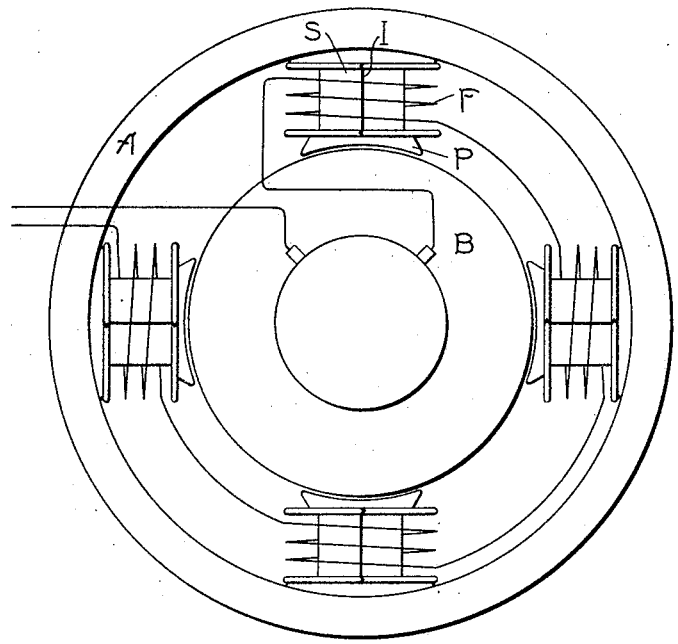

E. H. ANDERSON.
FIELD SPOOL FOR ELECTRIC MOTORS.
APPLICATION FILED JAN. 11, 1904.
916,961.
Patented Apr. 6, 1909.
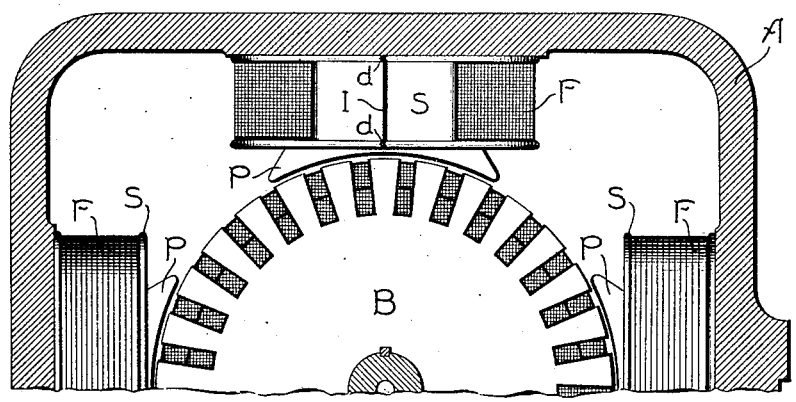
Fig. 1.
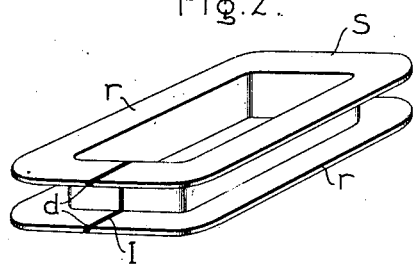
Fig. 2.
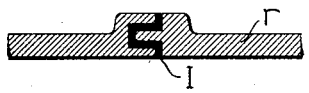
Fig. 3.
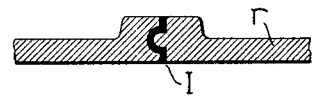
Fig. 4.
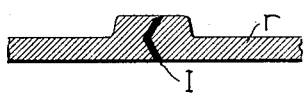
Fig. 5.
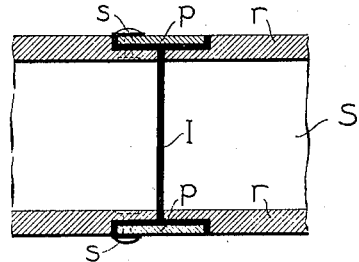
Fig. 6.
Fig. 7.
Witnesses.
Harry H. Tilden.
Helen Oxford.
Inventor.
Edward H. Anderson.
by Albert H. Davis
Att'y

UNITED STATES PATENT OFFICE.

EDWARD H. ANDERSON, OF SCHENECTADY, NEW YORK, ASSIGNOR TO GENERAL ELECTRIC COMPANY, A CORPORATION OF NEW YORK.

FIELD-SPOOL FOR ELECTRIC MOTORS.

No. 916,961.  Specification of Letters Patent.  Patented April 6, 1909.

Application filed January 11, 1904. Serial No. 188,475.

*To all whom it may concern:*

Be it known that I, EDWARD H. ANDERSON, a citizen of the United States, residing at Schenectady, in the county of Schenectady and State of New York, have invented certain new and useful Improvements in Field-Spools for Electric Motors, of which the following is a specification.

My invention relates to direct-current electric motors and has for its object the prevention of flashing at the commutator when the motor circuit is opened and closed. I have discovered that such flashing may be prevented by the use of a novel form of spool for the field coils of the motor.

Spools of metal may be made light and strong, and have passed into general use. As heretofore constructed they have formed continuous metal bands, and therefore closed electric circuits about the pole piece. Such construction, however, I have discovered is the cause of extremely unsatisfactory operation of direct-current motors in which it is employed, as I will set forth. Whenever a traveling contact is employed to complete the circuit of a motor, the circuit is liable to be temporarily broken at the contact from a variety of causes and this is particularly true in connection with third-rail systems where the current-collecting shoe is often separated from the supply rail by gaps at crossings, joints, or a collection of foreign matter such as ice, oil, dirt, etc., upon the rail. If a train operated from a third-rail is moving along the track with its controllers fully on, and therefore the motors receiving full-line voltage, and the collecting-shoe for any reason parts from the supply rail, current will be cut off from the motor. The operator having no knowledge of this the controllers are not disturbed and hence when the shoe again comes in contact with the rail the full voltage will be again applied. When the electric continuity of the field spools is maintained as heretofore the result of such application of voltage is an enormous flow of current, many times the normal value, which current is liable to damage the motor by heating, but the most serious consequence is the destructive sparking which occurs, it often becoming so great as to cause arcs to be formed between the brushes. The causes of this, I believe to be as follows: Upon the application of the voltage the field coils, which are in series with the armature in railway motors, tend to choke down the current but such tendency is neutralized by the field spools which constitute short-circuited secondaries in close inductive relation to the field coils and largely destroy their self-induction, as the magnetomotive-force due to currents induced in the spools is opposed to that due to the field coils. The opposition in the motor circuit to current flow is therefore practically reduced to the ohmic resistance of the windings and connections. A further result of the opposing magnetomotive-force set up by the spools, is that the flux through the armature is greatly cut down. Moreover, the armature is revolving at a comparatively high rate of speed and these conditions are the reverse of desirable for successful operation, as is well understood. My invention, by interrupting the electric continuity of the spools, operates to prevent their having any effect upon the induction of the field coils, which field coils then act to choke down any rush of current through the motor and, the magnetomotive-force of said coils being unopposed, a strong flux through the armature is produced. Satisfactory operation is thus obtained.

My invention has proved most efficacious in remedying the defects recited and the theory of its operations is, I believe, as outlined, but it may be however, that my invention operates in other ways of which I am not aware, to produce the desired results.

Referring to the accompanying drawings in which I have illustrated an embodiment of my invention, Figure 1 is a partial vertical section of a railway motor, one of the field coils being sectioned so that the application of my invention may be seen. The usual commutator brushes and connections for the armature have been omitted for the sake of clearness, as their construction and application are well understood; Fig. 2 is a perspective view of a field spool embodying my invention, such as is employed in the structure illustrated in Fig. 1; Figs. 3 to 7 inclusive are sections of spool flanges transverse to the insulating piece, showing various means by which my invention may be carried into effect, and Fig. 8 shows the motor and its connections somewhat diagrammatically.

Referring to Figs. 1, 2 and 3, A is the frame of a motor, to which are secured in any suitable manner the pole pieces P. B is the armature of the machine revolving within the pole pieces P in a well-known manner. Mounted upon the pole pieces in the usual manner are the field spools S, upon which are wound the field coils F which are connected as shown in Fig. 8 in series with the armature, as is customary in all standard railway motors. Inserted in each field spool is a piece of insulation I, which extends from side to side of the spool in such manner that the electric continuity of the spool is broken. In order that the edges of the spool which abut against the insulation may not have relative movement, depressions as $d$ are formed in said edges and projections upon the insulation register therewith. Lateral bearings are thus formed between the spool edges and the insulation. This is shown more clearly in Fig. 5, which is on an enlarged scale. It will be evident that in this construction it will be impossible for current to flow about the spools and therefore the spools cannot become short-circuited secondaries with relation to the field coils. If desired, instead of inserting a piece of insulation the continuity of the spool might be interrupted by cutting it through from side to side so that an air gap would be formed. This construction would not, however, be so mechanically strong as one in which the insulating piece was employed and in most cases the latter form would therefore be preferred. In order that the flanges of the spools may be stiffened, the registering depressions and projections of the insulation and spool edges are preferably formed in said flanges, but this is not essential. As the flanges are usually quite thin it will usually be desirable for them to be made thicker at the points where the insulation is inserted, as shown in Figs. 3 to 7 inclusive, in order that sufficient room for the forming of the projections and depressions may be obtained. In Figs. 3, 4 and 5, various forms of engagement between the edges of the spool flanges and the insulating piece are shown. It is thought that these figures are self explanatory. In Fig. 6 the outside portions of flanges $r$ are cut away so as to receive the retaining pieces $p$ which are separated from the spool by insulation I.

These pieces $p$ may be made of metal and are secured to the flange by means of the rivets $s$, the rivets $s$ being countersunk on the inner faces of the flanges $r$ in order to form a smooth bearing surface for the coil. In Fig. 7 the construction is obvious.

In the manufacture of the spool, the insulating piece or pieces may be placed in the mold and the spool cast around it or the piece may be molded into form and afterward placed in a slot formed in the spool.

In accordance with the patent statutes, I have described the principle of operation of my invention, together with the apparatus which I now consider to represent the best embodiment thereof; but I desire to have it understood that the apparatus shown in the drawings is only illustrative, and that the invention may be carried out by other means than the specific embodiment which I have shown.

What I claim as new, and desire to secure by Letters Patent of the United States, is,—

1. In an electric motor adapted for operation on direct currents, the combination with the pole pieces, of field coils thereon, metal spools for said coils, an armature connected in series with said field coils, each of said spools having its electric continuity broken whereby said field coils act as choke coils to prevent sudden variations of current strength in the motor circuit.

2. In an electric motor, the combination of a field frame provided with pole pieces, field coils mounted upon said pole pieces and connected in series with the motor armature, and metal spools for said coils, each of said spools having its electric continuity broken.

3. In an electric motor adapted for operation on direct currents, armature and field windings connected in series with each other, and metal spools upon which said field windings are arranged, said spools having their circumferential electrical continuity interrupted.

In witness whereof, I have hereunto set my hand this 9th day of January, 1904.

EDWARD H. ANDERSON.

Witnesses:
G. C. HOLLISTER,
HELEN ORFORD.